United States Patent
Ouyang

(10) Patent No.: US 10,980,279 B2
(45) Date of Patent: Apr. 20, 2021

(54) HEATING DEVICE AND ELECTRONIC CIGARETTE HAVING SAME

(71) Applicant: SHENZHEN IVPS TECHNOLOGY CO., LTD., Shenzhen (CN)

(72) Inventor: Junwei Ouyang, Shenzhen (CN)

(73) Assignee: SHENZHEN IVPS TECHNOLOGY CO., LTD., Shenzhen (CN)

( * ) Notice: Subject to any disclaimer, the term of this patent is extended or adjusted under 35 U.S.C. 154(b) by 196 days.

(21) Appl. No.: 16/151,213

(22) Filed: Oct. 3, 2018

(65) Prior Publication Data

US 2020/0008468 A1    Jan. 9, 2020

(30) Foreign Application Priority Data

Jul. 5, 2018   (CN) .......................... 201821063956.6

(51) Int. Cl.
*H05B 1/00*    (2006.01)
*H02J 7/00*    (2006.01)
*A24F 47/00*   (2020.01)

(52) U.S. Cl.
CPC .............. *A24F 47/008* (2013.01); *H02J 7/00* (2013.01); *H05B 1/00* (2013.01)

(58) Field of Classification Search
CPC .................................................... A24F 47/008
See application file for complete search history.

(56) References Cited

U.S. PATENT DOCUMENTS

2016/0198771 A1*   7/2016   Goggin .................... H05B 3/04
                                                    131/329

FOREIGN PATENT DOCUMENTS

| CN | 206923676 U | * | 1/2018 |
|----|-------------|---|--------|
| CN | 206923676 U |   | 1/2018 |
| CN | 207285196 U |   | 5/2018 |
| CN | 207561380 U | * | 7/2018 |
| CN | 207561380 U |   | 7/2018 |
| KR | 100734954 B1 |  | 7/2007 |
| WO | 2017075759 A1 | | 5/2017 |
| WO | 2017141017 A1 | | 8/2017 |

* cited by examiner

*Primary Examiner* — Eric Yaary
*Assistant Examiner* — Jennifer A Kessie
(74) *Attorney, Agent, or Firm* — IP-Pal Patent US; Klaus Michael Schmid

(57) ABSTRACT

The invention discloses a heating device for an electronic cigarette and an electronic cigarette. The heating device comprises a substrate and a control board and a heat generating unit mounted on the substrate, wherein the control board is provided with an avoidance hole and two inserting holes, the heat generating unit is provided with two conductive pins, one end of the heat generating unit is inserted into the avoidance hole, so that the heat generating unit is pre-mounted on the control board; and the two conductive pins are inserted into the two inserting holes, respectively, so that the control board and the heat generating unit establish an electrical connection. The technical solution of the invention is effective for facilitating the user to assemble.

9 Claims, 6 Drawing Sheets

HEATING DEVICE AND ELECTRONIC CIGARETTE HAVING SAME

TECHNICAL FIELD

The invention relates to a heating device for an electronic cigarette and an electronic cigarette applying the heating device for an electronic cigarette.

BACKGROUND

Studies have shown the use of "heating non-burning". Related studies have shown that nicotine and some tobacco flavor components can be transferred to smoke in a manner of only heating but not burning tobacco at a lower temperature below 500° C. Compared to traditional burning cigarettes, low temperature cigarettes can significantly reduce the release of tar and harmful components as a whole. At the same time, there is basically no side stream smoke, which is of little harm to others and the environment.

The heat generating unit of the existing low-temperature flue-cured tobacco is usually fixed in the heat generating cavity of the electronic cigarette, and performs wire welding with the internal electronic component by a wire to establish an electrical connection, which is inconvenient to assemble.

SUMMARY

The main object of the invention is to provide a heating device for an electronic cigarette, which is intended to facilitate the user to assemble.

In order to achieve the above object, the invention provides a heating device for an electronic cigarette, wherein the heating device comprises a substrate and a control board and a heat generating unit mounted on the substrate, wherein the control board is provided with an avoidance hole and at least two inserting holes, the heat generating unit is correspondingly provided with at least two conductive pins, one end of the heat generating unit is inserted into the avoidance hole, so that the heat generating unit is pre-mounted on the control board; and the at least two conductive pins are inserted into the at least two inserting holes, respectively, so that the control board and the heat generating unit establish an electrical connection.

Preferably, the avoidance hole is a polygonal hole, the heat generating unit is correspondingly provided with an inserting part, the inserting part is inserted into the avoidance hole, and the outer peripheral surface of the inserting part is fitly matched with the inner hole wall of the avoidance hole.

Preferably, the control board is further provided with a conductive member, the conductive member partially extends out from the inserting hole to be exposed to an outer surface of the control board, and the conductive pin abuts against the conductive member when being inserted into the inserting hole to establish an electrical connection.

Preferably, the heating device further comprises a conductive terminal, one end of the conductive terminal is mounted on the substrate and is electrically connected to the control board; and the other end of the conductive terminal is exposed to the outside of the substrate and is provided with a positive electrode contact and a negative electrode contact for establishing an electrical connection between an external power source and the control board.

Preferably, the conductive terminal further comprises a circuit board, the circuit board is relatively spaced apart from the control board, the surface of the circuit board facing the control board is provided with electrode pads for establishing electrical connection between the circuit board and the control board, the surface of the circuit board facing away from the control board is provided with the positive electrode contact and the negative electrode contact, and one end of the heat generating unit abuts against the circuit board through the control board to press the circuit board against the substrate.

Preferably, the substrate comprises a carrying member and a cover member, the cover member is mounted on the carrying member and encircles an internal cavity for receiving the control board together with the carrying member, one end of the heat generating unit is received in the internal cavity, and the other end thereof is exposed to the outside of the internal cavity through the cover member, one of the cover member and the heat generating body is provided with a limiting part, and the other thereof is provided with a limiting groove, and the limiting part is inserted into the limiting groove, so that the heat generating unit is limited to the cover member.

Preferably, one of the cover member and the control board is provided with a positioning part, and the other thereof is correspondingly provided with a positioning groove, and when the cover member covers the control board to the carrying member, one of the positioning parts is inserted into one of the positioning grooves, so that the circuit board is limited to the cover member.

Preferably, the heating device further comprises a smoke pan for receiving a tobacco product, the smoke pan is mounted on the carrying member and presses the cover member against the carrying member, and the heat generating body exposed to the outside of the internal cavity is received in the smoke pan.

Preferably, one of the smoke pan and the carrying member is provided with a connecting thread, and the other thereof is provided with a threaded hole, so that the smoke pan is detachably connected to the carrying member; or one of the smoke pan and the carrying member is convexly provided with a protrusion, and the other thereof is correspondingly provided with an engaging slot, so that the smoke pan is detachably connected to the carrying member; or both the smoke pot and the carrying member are each provided with a through hole correspondingly, the substrate further comprises a connecting pin, and the connecting pin is inserted into the two through holes, so that the smoke pan is detachably connected to the carrying member.

The invention further provides an electronic cigarette, wherein the electronic cigarette comprises a heating device for an electronic cigarette, the heating device for an electronic cigarette comprises a substrate and a control board and a heat generating unit mounted on the substrate, wherein the control board is provided with an avoidance hole and at least two inserting holes, the heat generating unit is correspondingly provided with two conductive pins, one end of the heat generating unit is inserted into the avoidance hole, so that the heat generating unit is pre-mounted on the control board; and the two conductive pins are inserted into the two inserting holes, respectively, so that the control board and the heat generating unit establish an electrical connection.

According to the heating device for an electronic cigarette of the technical solution of the invention, the control board is provided with an avoidance hole and at least two inserting holes in which the heat generating unit is inserted. The heat generating unit is partially inserted into the avoidance hole when being mounted, so that the heat generating unit is limited to the control board. At least two conductive pins correspondingly provided by the heat generating unit are inserted into at least two inserting holes provided by the control board, so that the heat generating unit and the control board establish an electrical connection to form an assembly. Finally, the assembly is mounted on the substrate so as to complete mounting. It is unnecessary to perform wire welding in the small space after assembling the heat generating unit in the electronic cigarette, which is convenient to mount.

BRIEF DESCRIPTION OF THE DRAWINGS

For a better illustration of the embodiments of the invention or the technical solution in the prior art, accompanying drawings needed in the description of the embodiments or the prior art are simply illustrated below. Obviously, the accompanying drawings described below are some embodiments of the invention. For those skilled in the art, other accompanying drawings may be obtained according to the structure shown in these accompanying drawings without creative work.

DESCRIPTION OF THE REFERENCE NUMBERS

Figure 1:
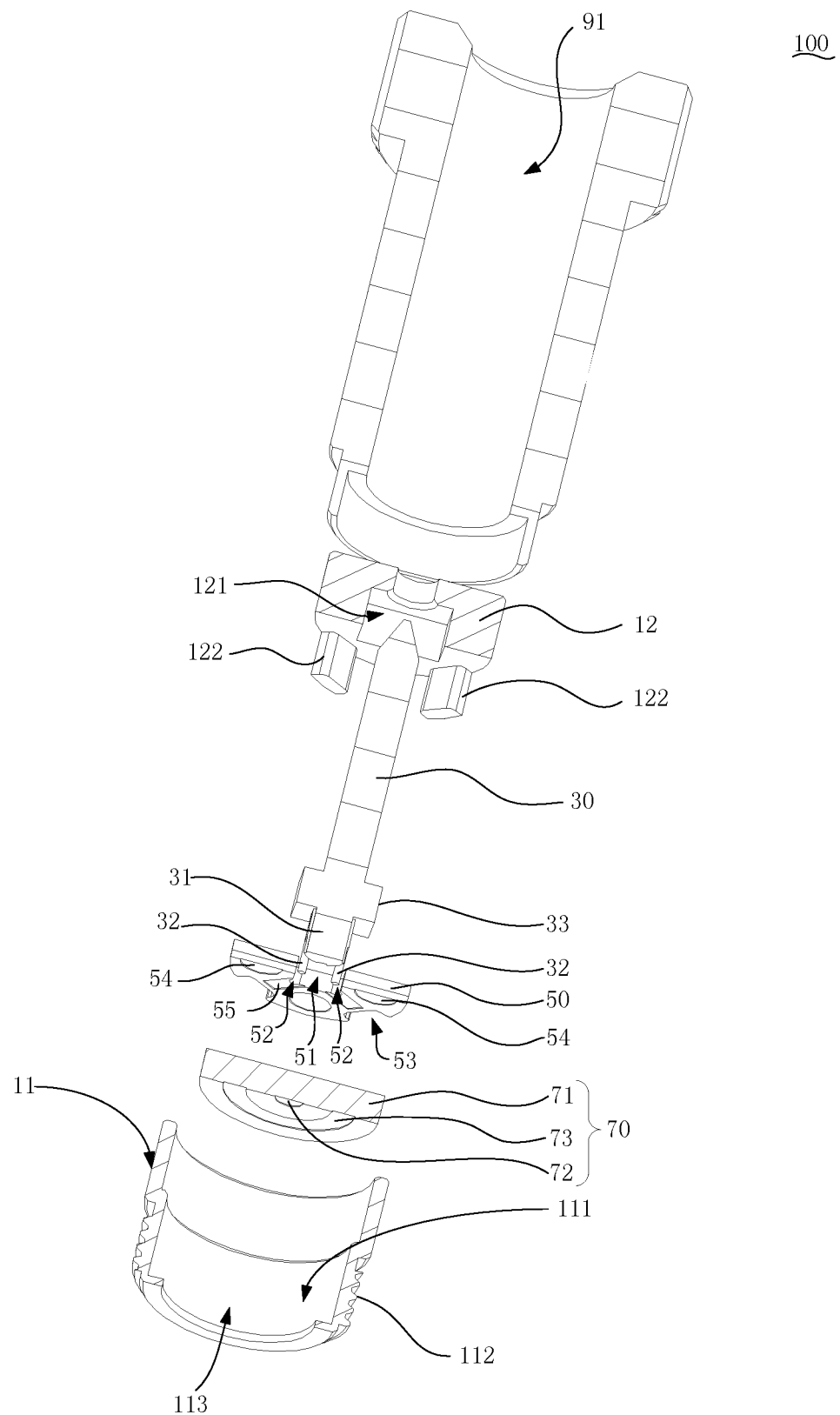
FIG. 1 is an exploded schematic diagram illustrating a connecting structure of a heating device for an electronic cigarette according to the invention.

| Reference number | Name of part |
| --- | --- |
| 100 | heating device |
| 10 | substrate |
| 11 | carrying member |
| 111 | mounting groove |
| 112 | connecting thread |
| 113 | window |
| 12 | cover member |
| 121 | limiting groove |
| 122 | positioning part |
| 123 | opening |
| 30 | heat generating unit |
| 31 | inserting part |
| 32 | conductive plug |
| 33 | limiting part |
| 50 | control board |
| 51 | avoidance hole |
| 52 | inserting hole |
| 53 | positioning groove |
| 54 | conductive pad |
| 55 | conductive member |
| 70 | conductive terminal |
| 71 | circuit board |
| 72 | positive electrode contact |
| 73 | negative electrode contact |

-continued

| Reference number | Name of part |
| --- | --- |
| 90 | smoke pan |
| 91 | receiving space |
| 200 | main body of an electronic cigarette |
| 210 | mounting chamber |
| 1000 | electronic cigarette |

The implementation of aims, the function features and the advantages of the present disclosure are described below in further detail in conjunction with embodiments with reference to the drawings.

DESCRIPTION OF THE EMBODIMENTS

A clear and complete description as below is provided for the technical solution in the embodiments of the invention in conjunction with the drawings in the embodiments of the invention. Obviously, the embodiments described hereafter are simply part embodiments of the invention, rather than all the embodiments. All other embodiments obtained by those skilled in the art based on the embodiments in the invention without creative work are intended to be included in the scope of protection of the invention.

It should be noted that all directional indications (such as top, bottom, left, right, front, behind . . . ) in the embodiments of the invention are merely to illustrate a relative position relation, a relative motion condition, etc. between each part in a certain state (for example, the state shown in the drawings). If the state changes, the directional indication changes accordingly.

In addition, if terms "first", "second", etc. appear in the invention, they are merely for the purpose of description, but cannot be understood as the indication or implication of relative importance or as the implicit indication of the number of the designated technical features; therefore, features defined by "first" and "second" may specifically or implicitly comprise at least one such feature. In addition, technical solutions of each embodiment of the invention may be combined mutually; however, this must be carried out on the basis that those skilled in the art can implement the combination. When the combination of technical solutions has a conflict or cannot be implemented, it should be considered that such combination of technical solutions does not exist and is not in the scope of protection claimed by the invention.

In the invention, unless otherwise specifically stated and defined, terms "connected", "fixed", etc. should be interpreted expansively. For example, "fixed" may be fixed connection, detachable connection, or integration; may be mechanical connection or electrical connection; direct connection, indirect connection through an intermediate, or internal communication between two elements or interaction of two elements, unless otherwise specifically defined. Those skilled in the art can understand the specific implication of the above terms in the invention according to specific conditions.

Referring to FIG. 1 to FIG. 6, the invention provides a heating device 100 for an electronic cigarette 1000. The electronic cigarette 1000 is provided with a mounting chamber 210 in which the heating device 100 is mounted. The heating device 100 establishes an electrical connection with the electronic cigarette 1000 when being received in the heat generating cavity. The heating device 100 comprises a substrate 10 and a control board 50 and a heat generating unit 30 mounted on the substrate 10, wherein the control board 50 is provided with an avoidance hole 51 and at least two inserting holes 52, the heat generating unit 30 is correspondingly provided with at least two conductive pins 32, one end of the heat generating unit 30 is inserted into the avoidance hole 51, so that the heat generating unit 30 is pre-mounted on the control board 50; and the at least two conductive pins 32 are inserted into the at least two inserting holes 52, respectively, so that the control board 50 and the heat generating unit 30 establish an electrical connection.

According to the heating device 100 for an electronic cigarette 1000 of the technical solution of the invention, the control board 50 is provided with an avoidance hole 51 and at least two inserting holes 52 in which the heat generating unit 30 is inserted. The heat generating unit 30 is partially inserted into the avoidance hole 51 when being mounted, so that the heat generating unit 30 is limited to the control board 50. At least two conductive pins 32 correspondingly provided by the heat generating unit 30 are inserted into at least two inserting holes 52 provided by the control board 50, so that the heat generating unit 30 and the control board 50 establish an electrical connection to form an assembly. Finally, the assembly is mounted on the substrate 10 so as to complete mounting. It is unnecessary to perform wire welding in the small space after assembling the heat generating unit 30 in the electronic cigarette 1000, which is convenient to mount. At the same time, only the conductive pin 32 of the heat generating unit 30 needs to be pulled out from the insertion groove when being replaced, and the operation is convenient. When the heat generating unit 30 is damaged or more dirt is left on the surface of the heat generating unit 30 in the later period, the user can replace the heat generating unit with a spare heat generating unit 30 by himself, and the entire heating device 100 does not need to be replaced, effectively saving the use cost.

Specifically, in the present embodiment, the heat generating unit 30 is a ceramic heat generating rod, and the outer wall of one end of the ceramic heat generating rod is provided with two conductive pins 32 as an example. The inserting hole 52 is communicated with the avoidance groove, so that when the ceramic heat generating rod is inserted into the avoidance groove, the conductive pin 32 is inserted into the inserting hole 52, and the conductive pin 32 abuts against the inserting hole 52 at the same time, preventing the phenomenon that the ceramic heat generating rod rotates during use to cause damage such as bend to the conductive pin 32.

Figure 5:
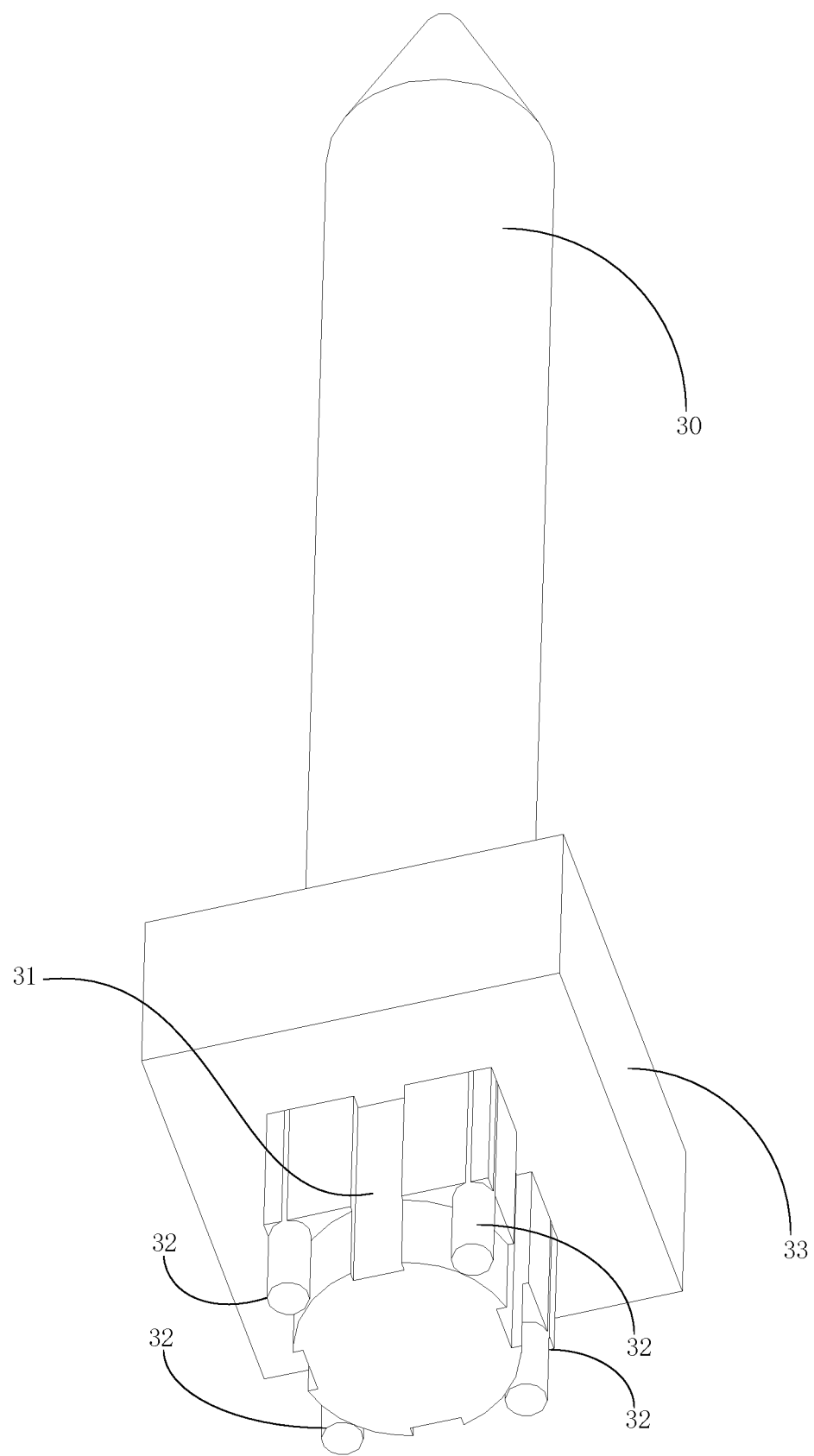
FIG. 5 is a perspective schematic diagram illustrating a connecting structure of a heat generating unit in a heating device for an electronic cigarette according to the invention.

It is to be understood that, in practical applications, the heat generating unit 30 is not limited to the manner in which two conductive pins 32 are provided to establish electrical connection with the control board 50. For example, as shown in FIG. 5, in another embodiment of the invention, the heating manner in which two sets of heat generating units (not shown) are provided in the heat generating unit 30, and therefore, the heat generating unit 30 is provided with four conductive pins 32, so that the two heat generating units are electrically connected to the control board 50 to achieve multi-segment heating also falls within the scope of protection of the invention; meanwhile, if the two sets of heat generating units 30 share the same negative electrode, the heat generating unit 30 is provided with three conductive pins. Similarly, the manner in which if the heat generating unit 30 is provided with more sets of heat generating units and is correspondingly provided with more conductive pins to achieve segmented heating falls within the scope of protection of the invention.

Specifically, the avoidance hole 51 is a polygonal hole, the heat generating unit 30 is correspondingly provided with an inserting part 31, the inserting part 31 is inserted into the avoidance hole 51, and the outer peripheral surface of the inserting part 31 is fitly matched with the inner hole wall of the avoidance hole 51. Here, in the present embodiment, the shape of the avoidance hole 51 is rectangular. One end of the conductive body is provided with an inserting part 31. The side structure of the inserting part 31 is matched with the rectangular avoidance hole 51, so that when one end of the conductive body is inserted into the rectangular avoidance hole 51, the end of the conductive body abuts against the inner wall of the avoidance hole 51 for limiting, effectively preventing the phenomenon that the heat generating body 30 rotates to cause damage such as bend to the conductive plug.

It is to be understood that, in practical applications, the avoidance hole 51 is not limited to the manner in which a rectangle is used as described above. For example, in other embodiments of the invention, the manner in which a triangle or any other shape having edges is used to prevent rotation between the heat generating unit 30 and the circuit board 71 also falls within the scope of protection of the invention.

Figure 4:
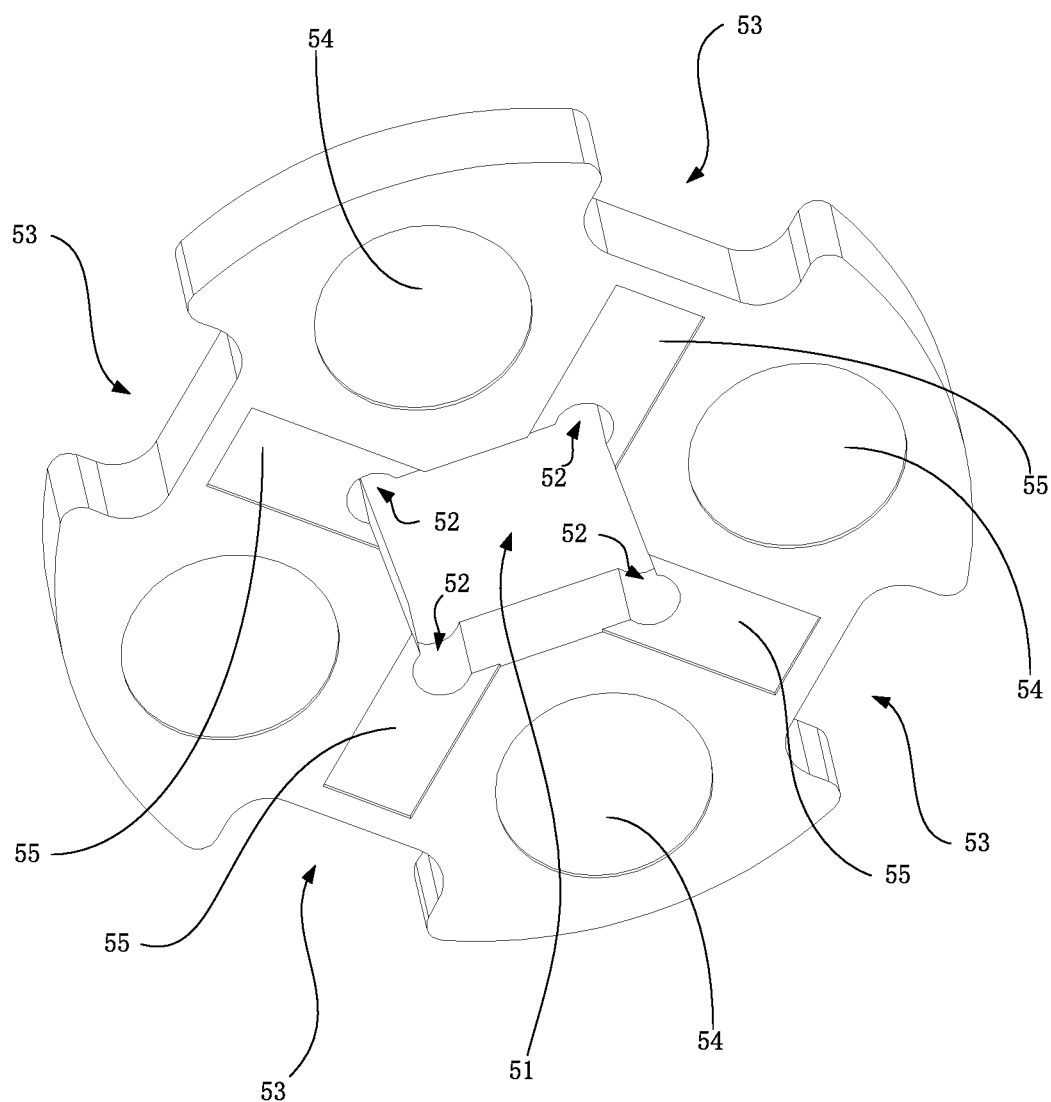
FIG. 4 is a perspective schematic diagram illustrating a connecting structure of a control board in a heating device for an electronic cigarette according to the invention.

Further, as shown in FIG. 4, in the embodiment of the invention, the control board 50 is further provided with a conductive member 55, the conductive member 55 partially extends out from the inserting hole 52 to be exposed to an outer surface of the control board 50, and the conductive pin 32 abuts against the conductive member 55 when being inserted into the inserting hole 52 to establish an electrical connection. Here, in the present embodiment, the inner wall of the inserting hole 52 is further provided with a conductive member 55, one end of the conductive member 55 protrudes from the inserting hole 52 and is exposed to the surface of the control board 50 facing away from the heat generating unit 30 to form a conductive pad 54 for facilitating the wiring of the control board 50, so that the control board 50 establishes an electrical connection with the conductive member 55 exposed to the outside of the inserting hole 52. The conductive pin 32 is inserted into the inserting hole 52 and abuts against the conductive member 55 to establish an electrical connection so as to be communicated with the control board 50. At the same time, the conductive member 55 is partially exposed to the surface of the control board 50 facing away from the heat generating unit 30. The user can solder the surface of the control board 50 facing away from the heat generating unit 30 to fix the conductive pin 32 to the control board 50, enhancing the conductive stability. At the same time, the phenomenon is prevented that the surface flatness of one end of the circuit board 71 facing the heat generating unit 30 is affected by the processing technology of soldering, and protruding pads are formed, which is inconvenient to be mounted on the substrate 10.

It is to be understood that, in practical applications, the conductive member 55 can be applied to the inner groove wall of the inserting hole 52 using a conductive coating. At the same time, the manner in which in order to ensure the conductive stability, it is not limited to soldering on the back surface of the control board 50 as described above, for example, a conductive pin may also be provided, the conductive pin is inserted into the inserting hole 52, and the conductive pin 32 is pressed to abut against the conductive member 55 to ensure electrical connection also falls within the scope of protection of the invention.

Further, as shown in FIG. 1, in the embodiment of the invention, the heating device 100 further comprises a conductive terminal 70, one end of the conductive terminal 70 is mounted on the substrate 10 and is electrically connected to the control board 50; and the other end of the conductive terminal 70 is exposed to the outside of the substrate 10 and is provided with a positive electrode contact 72 and a negative electrode contact 73 for establishing an electrical connection between an external power source and the control board 50. Here, the external power source is an electronic cigarette 1000, and the electronic cigarette 1000 is correspondingly provided with an output positive electrode elastic pin and an output negative electrode elastic pin. The heating device 100 is electrically connected to the main body 200 of the electronic cigarette 1000 by threads. In the present embodiment, the negative electrode contact 73 of the conductive terminal 70 is annular. The positive electrode contact 72 is provided in the middle of the annular shape encircled by the negative electrode contact 73. When the heating device 100 is mounted on the main body 200 of the electronic cigarette 1000, the positive electrode output elastic pin is provided corresponding to the positive electrode contact 72, and the negative electrode output elastic pin is located on the annular trajectory of the negative electrode contact 73, so that when the heating device 100 is rotated to any angle and is mounted on the electronic cigarette 1000, the negative electrode contact 73 and the positive electrode contact 72 always correspond to the output negative electrode and the output positive electrode, effectively preventing the phenomenon that the electrode contact misalignment results in an obstructed circuit. At the same time, the electronic cigarette 1000 adopts a conductive elastic pin to establish an electrical connection with the heating device 100 so as to form an elastic contact between the conductive terminal 70 and the output electrode of the electronic cigarette 1000, effectively causing the positive electrode contact 72 and the negative electrode contact 73 to closely abut against the output positive electrode and the output negative electrode of the electronic cigarette 1000, respectively, and enhancing the stability of current conduction.

It is to be understood that, in practical applications, it is not limited to using the annular negative electrode contact 73 as described above to prevent the reverse connection of the circuit. For example, in another embodiment of the invention, the manner in which if the heating device 100 and the electronic cigarette 1000 are connected in a snap-fit manner, the conductive terminal 70 comprises a positive electrode contact 72 and two negative electrode contacts 73 which are spaced apart symmetrically with respect to the positive electrode contact 72 to effectively prevent the user from reversely connecting the electrode contact of the heating device 100 and the output electrode of the electronic cigarette 1000 also falls within the scope of protection of the invention.

Figure 2:
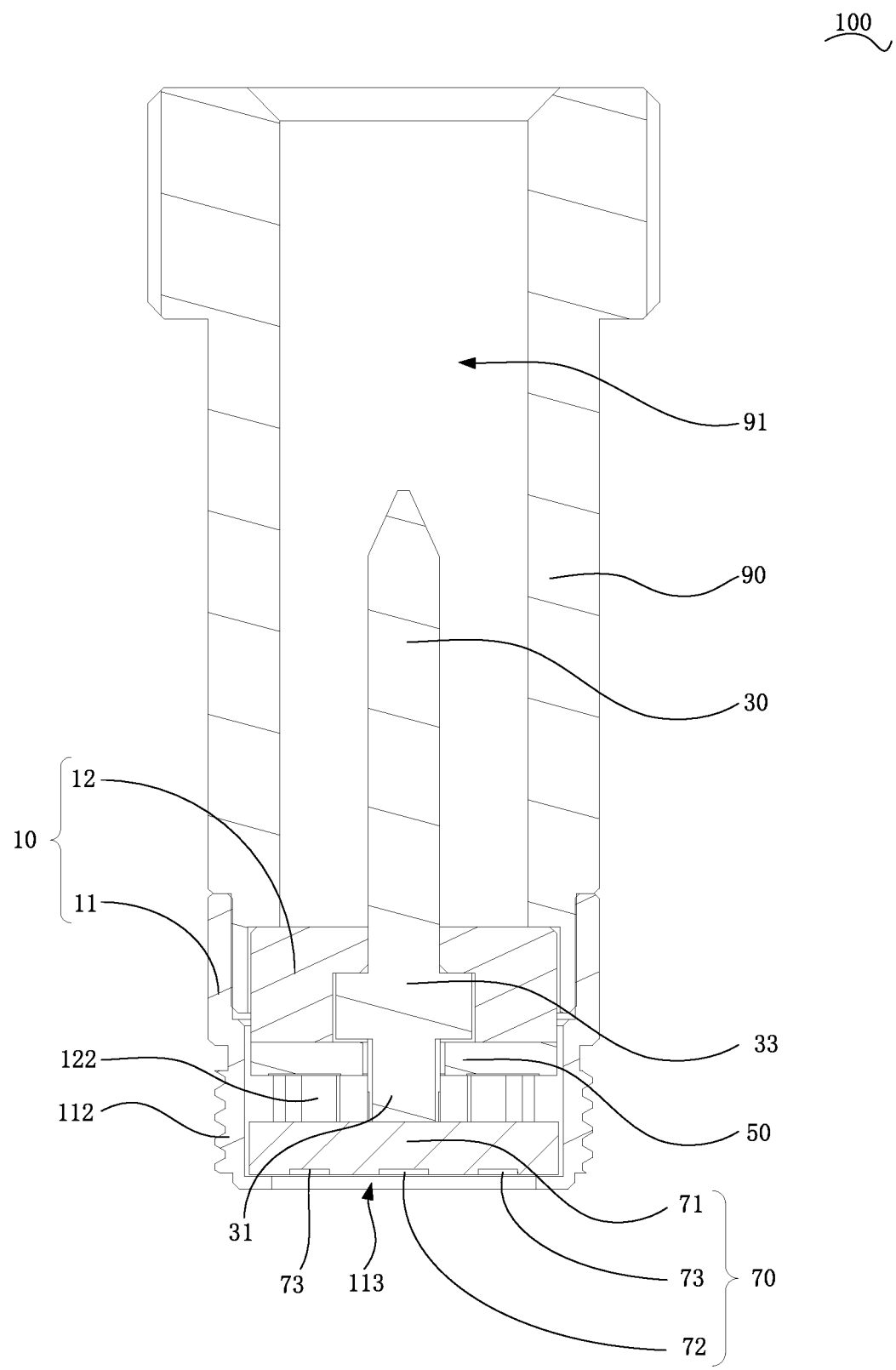
FIG. 2 is across-sectional schematic diagram illustrating a connecting structure of a heating device for an electronic cigarette according to the invention.

Specifically, as shown in FIG. 1 and FIG. 2, in the embodiment of the invention, the conductive terminal 70 further comprises a circuit board 71, the circuit board 71 is relatively spaced apart from the control board 50, the surface of the circuit board 71 facing the control board 50 is provided with electrode pads for establishing electrical connection between the circuit board 71 and the control board 50, the surface of the circuit board 71 facing away from the control board 50 is provided with the positive electrode contact 72 and the negative electrode contact 73 exposed to the substrate 10, and one end of the heat generating unit 30 abuts against the circuit board 71 through the control board 50 to press the circuit board 71 against the substrate 10. Here, in the present embodiment, the control board 50 is provided with a plurality of conductive pads 54, the circuit board 71 is correspondingly provided with electrode pads, and then the circuit board 71 and the control board 50 are electrically connected through a conductive cable. The positive electrode contact 72 and the negative electrode contact 73 are mounted on a surface of the circuit board 71 facing away from the control board 50. One end of the heat generating body 30 abuts against the circuit board 71 through the control board 50, and provides a certain supporting force for the circuit board 71, effectively preventing the phenomenon that the elastic conductive ejector pin damages the circuit board 71 due to the excessive force when the heating device 100 is rotatably mounted on the electronic cigarette 1000. At the same time, the circuit board 71 of the conductive terminal 70 and the control board 50 are separately provided, effectively preventing the phenomenon that the positive electrode contact 72 and the negative electrode contact 73 are damaged due to the friction with the conductive terminal 70 during long-term use to result in the need to replace the entire control board 50, and further reducing the use cost.

Specifically, as shown in FIG. 1 or FIG. 2, in the embodiment of the invention, the substrate 10 comprises a carrying member 11 and a cover member 12, the cover member 12 is mounted on the carrying member 11 and encircles an internal cavity for receiving the control board 50 together with the carrying member 11, one end of the heat generating unit 30 is received in the internal cavity, and the other end thereof is exposed to the outside of the internal cavity through the cover member 12, one of the cover member 12 and the heat generating body 30 is provided with a limiting part 33, and the other thereof is provided with a limiting groove 121, and the limiting part 33 is inserted into the limiting groove 121, so that the heat generating unit 30 is limited to the cover member 12. Here, in the present embodiment, the carrying member 11 is provided with a mounting groove 111, and the outer wall is provided with a connecting thread 112 and a window 113 exposing the positive electrode contact 72 and the negative electrode contact 73. The heat generating unit 30 is pre-mounted on the control board 50, and then performs wire welding connection between the circuit board 71 and the control board 50 so that after the heat generating unit 30, the circuit board 71 and the control board 50 form an assembly, the assembly is mounted in the mounting groove 111. The cover member 12 is mounted in the mounting groove 111, and covers the control board 50 and the circuit board 71 to complete mounting, which is convenient to assemble. The wires of the heat generating unit 30 are mounted in the carrying member 11 after being soldered. It is unnecessary to perform wire welding in the small space, resulting in the phenomenon that it is easy to burn other components. At the same time, the cover member 12 is provided with an opening 123. One end of the heat generating unit 30 is covered by the cover member 12, and the other end thereof is exposed to the outside of the cover member 12 through the opening 123. The heat generating body 30 is provided with a limiting part 33. The cover member 12 is provided with a limiting groove 121 so that one end of the heat generating unit 30 is pressed against the mounting groove 111 to abut against the circuit board 71, preventing the phenomenon that the heat generating unit 30 is detached from the cover member 12.

Figure 3:
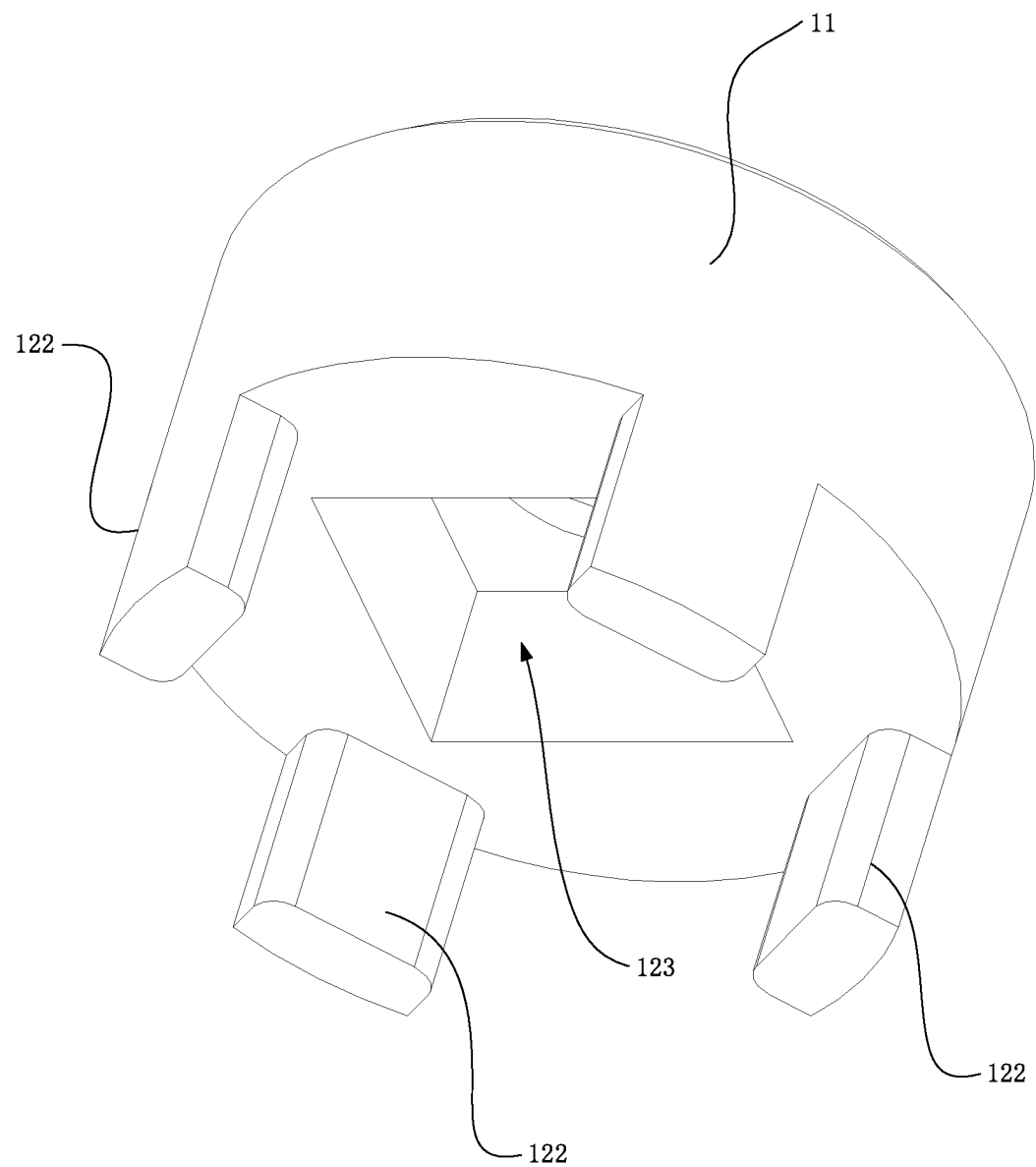
FIG. 3 is a perspective schematic diagram illustrating a connecting structure of a cover member in a heating device for an electronic cigarette according to the invention.

Further, as shown in FIG. 3 and FIG. 4, in the embodiment of the invention, one of the cover member 12 and the control board 50 is provided with a positioning part 122, and the other thereof is correspondingly provided with a positioning groove 53, and when the cover member 12 covers the control board to the carrying member 11, one of the positioning parts 122 is inserted into one of the positioning grooves 53, so that the circuit board 71 is limited to the cover member 12. Here, in the present embodiment, the periphery of the cover member 12 is convexly provided with four positioning parts 122, and the control board 50 is correspondingly provided with four positioning grooves 53 to prevent the phenomenon that the control board 50 shakes during use and prevent the phenomenon that the heat generating unit 30 drives the control board 50 to rotate together at the same time.

Further, as shown in FIG. 1 and FIG. 2, in the embodiment of the invention, the heating device 100 further comprises a smoke pan 90 for receiving a tobacco product, the smoke pan 90 is mounted on the carrying member 11 and presses the cover member 12 against the carrying member 11, and the heat generating body 30 exposed to the outside of the internal cavity is received in the smoke pan 90. Here, in the present embodiment, the heating device 100 is further provided with a smoke pan 90. The smoke pan 90 is in a hollow tube shape. The smoke pan 90 is provided with a connecting thread 112. The inner wall of the mounting groove 111 provided by the carrying member 11 is provided with an internal thread to form a threaded hole, so that the smoke pan 90 and the carrying member 11 are detachably connected and encircle a receiving space 91 for receiving the tobacco product together with the carrying member 11. When the smoke pan 90 is screwed to the carrying member 11, the cover member 12 is gradually pressed against the carrying member 11, and then the control board 50, the circuit board 71 and the heat generating unit 30 are pressed against the carrying member 11. It is easy to mount and detach without using bolts. At the same time, the smoke pan 90 and the carrying member 11 are connected by threads. The screwing force of the smoke pan 90 may be adjusted, thereby adjusting the pressing force of the heat generating unit 30 against the circuit board 71, preventing the phenomenon that the smoke pan 90 is snap-fit with the carrying member 11 with force in a snap-in manner so that the heat generating body 30 crushes the circuit board 71.

It is to be understood that, in practical applications, the smoke pan 90 is not limited to being mounted on the carrying member 11 in a threaded connecting manner as described above. For example, in another embodiment of the invention, the manner in which one of the smoke pan 90 and the carrying member 11 is convexly provided with a protrusion, and the other thereof is correspondingly provided with an engaging slot, so that the smoke pan 90 is detachably connected to the carrying member 11; or both the smoke pot 90 and the carrying member 11 are each provided with a through hole correspondingly, the substrate 10 further comprises a connecting pin, and the connecting pin is inserted into the two through holes, so that the smoke pan 90 is detachably connected to the carrying member 11, falls within the scope of protection of the invention.

Figure 6:
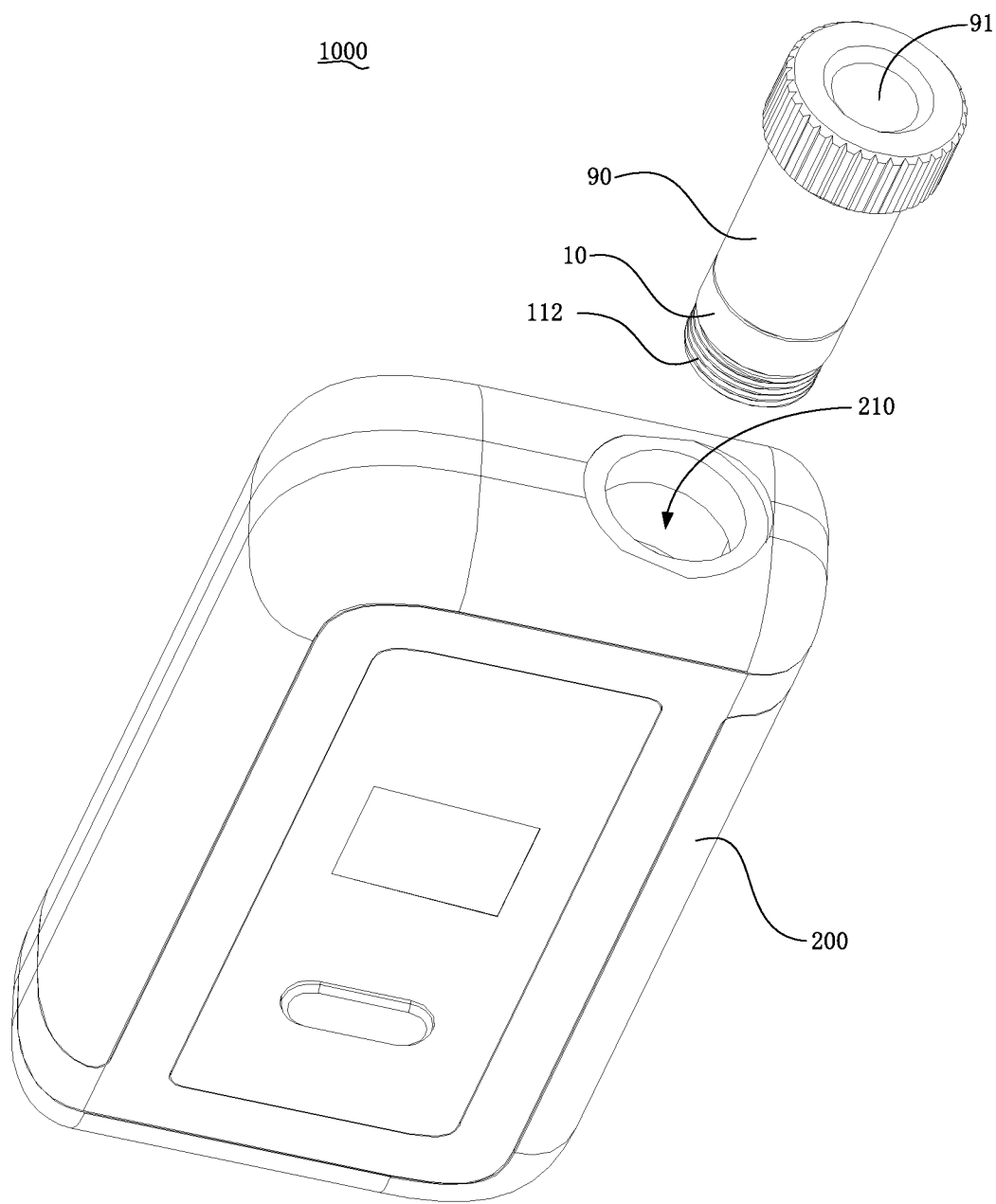
FIG. 6 is an exploded schematic diagram illustrating a heating device for an electronic cigarette according to the invention mounted on the main body of the electronic cigarette.

Referring to FIG. 6, the invention further provides an electronic cigarette 1000. The electronic cigarette 1000 comprises a main body 200 and a heating device 100 for the electronic cigarette 1000. The main body 200 for the electronic cigarette 1000 is provided with a mounting chamber 210 for receiving the heating device 100. The heating device 100 is mounted in the mounting chamber 210 by threaded connection. Refer to the above embodiment for the specific structure of the heating device 100. Due to the use of all the technical solutions of all the above embodiments, the electronic cigarette 1000 has at least all the beneficial effects brought by the technical solutions of the above embodiments, which will not be described in detail herein.

The above are preferred embodiments of the invention merely and are not intended to limit the patent scope of the invention. Any equivalent structures made according to the description and the accompanying drawings of the invention without departing from the idea of the invention, or any equivalent structures applied in other relevant technical fields directly or indirectly are intended to be included in the patent protection scope of the invention.

What is claimed is:

1. A heating device for an electronic cigarette, wherein the heating device comprises a substrate and a control board and a heat generating unit arranged on the substrate, wherein the control board is provided with an avoidance hole and at least two inserting holes, the heat generating unit is correspondingly provided with at least two conductive pins, one end of the heat generating unit is inserted into the avoidance hole, so that the heat generating unit is pre-mounted on the control board; and the at least two conductive pins are inserted into the at least two inserting holes, respectively, so that the control board and the heat generating unit establish an electrical connection;
wherein the control board is further provided with a conductive member, the conductive member partially extends out from the inserting holes to be exposed to an outer surface of the control board, and the conductive pins abut against the conductive member when being inserted into the inserting holes to establish an electrical connection.

2. The heating device for an electronic cigarette according to claim 1, wherein the avoidance hole is a polygonal hole, the heat generating unit is correspondingly provided with an inserting part, the inserting part is inserted into the avoidance hole, and the outer peripheral surface of the inserting part matches with the inner hole wall of the avoidance hole.

3. The heating device for an electronic cigarette according to claim 1, wherein the heating device further comprises a conductive terminal, one end of the conductive terminal is mounted on the substrate and is electrically connected to the control board; and the other end of the conductive terminal is exposed to the outside of the substrate and is provided with a positive electrode contact and a negative electrode contact for establishing an electrical connection between an external power source and the control board.

4. The heating device for an electronic cigarette according to claim 3, wherein the conductive terminal further comprises a circuit board, the circuit board is relatively spaced apart from the control board, the surface of the circuit board facing the control board is provided with electrode pads for establishing electrical connection between the circuit board and the control board, the surface of the circuit board facing away from the control board is provided with the positive electrode contact and the negative electrode contact, and one end of the heat generating unit abuts against the circuit board through the control board to press the circuit board against the substrate.

5. The heating device for an electronic cigarette according to claim 1, wherein the substrate comprises a carrying member and a cover member, the cover member is mounted on the carrying member and encircles an internal cavity for receiving the control board together with the carrying member, one end of the heat generating unit is received in the internal cavity, and the other end thereof is exposed to the outside of the internal cavity through the cover member, one of the cover member and the heat generating body is provided with a limiting part, and the other of the cover member and the heat generating body is provided with a limiting groove, and the limiting part is inserted into the limiting groove, so that the heat generating unit is limited to the cover member.

6. The heating device for an electronic cigarette according to claim 5, wherein one of the cover member and the control board is provided with a positioning part, and the other of the cover member and the control board is correspondingly provided with a positioning groove, and when the cover member covers the control board in the carrying member, one of the positioning parts is inserted into one of the positioning grooves, so that the circuit board is limited to the cover member.

7. The heating device for an electronic cigarette according to claim 5, wherein the heating device further comprises a smoke pan for receiving a tobacco product, the smoke pan is mounted on the carrying member and presses the cover member against the carrying member, and the heat generating body exposed to the outside of the internal cavity is received in the smoke pan.

8. The heating device for an electronic cigarette according to claim 7, wherein one of the smoke pan and the carrying member is provided with a connecting thread, and the other thereof is provided with a threaded hole, so that the smoke pan is detachably connected to the carrying member; or one of the smoke pan and the carrying member is convexly provided with a protrusion, and the other thereof is correspondingly provided with an engaging slot, so that the smoke pan is detachably connected to the carrying member; or both the smoke pot and the carrying member are each provided with a through hole correspondingly, the substrate further comprises a connecting pin, and the connecting pin is inserted into the two through holes, so that the smoke pan is detachably connected to the carrying member.

9. An electronic cigarette, wherein the electronic cigarette comprises the heating device for an electronic cigarette according to claim 1.

* * * * *